(12) United States Patent
Wu et al.

(10) Patent No.: US 10,365,085 B2
(45) Date of Patent: Jul. 30, 2019

(54) METHOD AND SYSTEM FOR MEASURING THICKNESS OF THIN FILM

(71) Applicant: Institute of Nuclear Energy Research, Atomic Energy Council, Executive Yuan, R.O.C., Taoyuan (TW)

(72) Inventors: Tzong-Daw Wu, Taoyuan (TW); Jiun-Shen Chen, Taoyuan (TW); Ching-Pei Tseng, Taoyuan (TW); Cheng-Chang Hsieh, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 36 days.

(21) Appl. No.: 15/826,884

(22) Filed: Nov. 30, 2017

(65) Prior Publication Data
US 2019/0120610 A1    Apr. 25, 2019

(30) Foreign Application Priority Data
Oct. 20, 2017   (TW) .............................. 106136218 A

(51) Int. Cl.
*G01B 11/06*    (2006.01)
*G06N 3/02*    (2006.01)

(52) U.S. Cl.
CPC ............ *G01B 11/0625* (2013.01); *G06N 3/02* (2013.01)

(58) Field of Classification Search
CPC ..... G01B 11/02; G01B 11/06; G01B 11/0625; G06N 3/02; G06N 3/08; G06N 3/12; G06F 15/18; G06F 15/42; G06F 3/16; G06F 19/00; G06F 17/50; G01N 31/00; G01N 33/497; G06T 7/00; G06T 11/00; G06K 9/62; A61B 6/00; G03F 7/00; G03F 7/20; G03F 7/70491
See application file for complete search history.

(56) References Cited

U.S. PATENT DOCUMENTS

2002/0072003 A1*   6/2002   Brill ..................... G03F 7/70491
                                                        430/30

FOREIGN PATENT DOCUMENTS

KR          100769566 B1 *  10/2007   ............ G01B 11/02

OTHER PUBLICATIONS

Tzong-Daw Wu et al., Applying theoretical spectra to artificial neural networks for real-time estimation of thin film thickness, Journal of Optical Engineering published on Dec. 22, 2016, vol. /p. 55(12) / 125106.

* cited by examiner

*Primary Examiner* — Jamil Ahmed
(74) *Attorney, Agent, or Firm* — Locke Lord LLP; Tim Tingkang Xia, Esq.

(57) ABSTRACT

A method for measuring a thickness of a thin film includes: a step of basing on a training database to establish an artificial neural network, the training database including a plurality of modified spectra and a plurality of film thicknesses corresponding individually to the plurality of modified spectra; a step of measuring a sample having a coated film so as to obtain a spectrum; and, a step of running the artificial neural network already trained by the plurality of modified spectra so as to use the spectrum to estimate a thickness of the coated film on the sample. In addition, a system related to the method for measuring a thickness of a thin film is provided to include a measuring unit, a spectrometer and a processing unit.

8 Claims, 8 Drawing Sheets

METHOD AND SYSTEM FOR MEASURING THICKNESS OF THIN FILM

CROSS REFERENCE TO RELATED APPLICATION

This application claims the benefit of Journal of Optical Engineering (2016 Dec. 22) and Taiwan Patent Application Serial No. 106136218, filed Oct. 20, 2017, the subject matters of which are incorporated herein by reference.

BACKGROUND OF THE INVENTION (1) Field of the Invention

The invention relates to a measuring method and system, and more particularly to a method and system for measuring a thickness of a thin film that can measure the thickness of a coated film in a real-time manner during a manufacturing process.

(2) Description of the Prior Art

Manufacturing processes for coating thin films have been widely applied to produce optical components, low-emissivity films and glasses, and various elements in the semiconductor industry. In these coating processes, control upon the thickness of the thin film is particularly important to the quality of the products. By having a process for coating an anti-reflection film on an optical head as an example, precision on the thickness of the coated film plays a critical role in the performance of anti-reflection. Further, by having a process for coating a low-emissivity film, the thickness of the coated film is one of key reasons that determine performance in heat insulation. Thus, the topic of monitoring the change in thickness of the thin film in a real-time manner during the manufacturing process so as for locating accurate timing to adjust process parameters, for stabilizing manufacturing quality and for varying purposely product's properties is definitely crucial to the art.

Generally speaking, among various methods for measuring the thickness of the thin film, a destructive detecting method and a numerical fitting method are usually seen. The destructive detecting method for measuring the thickness of the thin film can't be applied to measure the real-time thickness of the film while the coating process is under way. On the other hand, the numerical fitting method is used to compute the thickness of the coated film. However, since the computation involves the recursive iteration, plenty of calculation time would be needed, and also this method can't be applied effectively to measure or even monitor the thickness of the coating film in a real-time manner.

Thus, a method and system for measuring a thickness of a thin film that can monitor the thickness of the film in a real-time manner, while the coating process is under way, is definitely needed and welcome in the art.

SUMMARY OF THE INVENTION

Accordingly, it is an object of the present invention to provide a method for measuring a thickness of a thin film and a system for measuring a thickness of a thin film, both of which can measure the thickness of the thin film in a rapid, accurate and non-destructive manner, such that a goal of monitoring the thickness of the film in a real-time manner, while the coating process is under way, can be obtained.

In the present invention, the method for measuring a thickness of a thin film includes the steps of: (1) basing on a training database to establish an artificial neural network, the training database including a plurality of modified spectra and a plurality of film thicknesses corresponding individually to the plurality of modified spectra; (2) measuring a sample having a coated film so as to obtain a spectrum; and, (3) running the artificial neural network already trained by the plurality of modified spectra so as to use the spectrum to estimate a thickness of the coated film on the sample.

In one embodiment of the present invention, the aforesaid step (1) includes the steps of: (11) determining a substrate of the sample, a material of the coated film, and a measuring range for the sample; (12) applying the thin-film optical theory to establish randomly a plurality of simulated spectra in correspondence to different thicknesses of the coated film on the sample within the measuring range, in which each of the plurality of simulated spectra includes an optical parameter of the sample with respect to a specific wavelength of the light beam; and, (13) adding a noise parameter into each of the plurality of simulated spectra so as to form corresponding one of the plurality of modified spectra.

In one embodiment of the present invention, the optical parameter includes one of transmittance and reflectance.

In one embodiment of the present invention, the noise parameter is in a −5%~+5% range.

In one embodiment of the present invention, the aforesaid step (1) further includes a step of having each of the plurality of modified spectra as an input layer, each of the plurality of film thicknesses as an output layer, and obtaining a hidden layer by training the artificial neural network, so that the output layer is obtained by calculating the input layer through the hidden layer.

In one embodiment of the present invention, the artificial neural network is trained by adopting an algorithm for back-propagation neural networks (BPN).

In the present invention, the system for measuring a thickness of a thin film includes a measuring unit, a spectrometer and a processing unit. The measuring unit is to emit a light beam onto a sample having a coated film. The spectrometer, connected with the measuring unit, is to receive the light beam and thereby to obtain a spectrum. The processing unit, connected with the spectrometer, includes an artificial neural network (ANN) operational module and a training database. The ANN operational module bases on the training database to establish an artificial neural network. The training database includes a plurality of modified spectra and a plurality of film thicknesses corresponding individually to the plurality of modified spectra, the ANN operational module receives the spectra, and the ANN operational module runs the artificial neural network already trained by the plurality of modified spectra so as to use the spectrum to estimate a thickness of the coated film on the sample.

In one embodiment of the present invention, each of the plurality of modified spectra includes a simulated spectrum and a noise parameter, in which the noise parameter is in a −5%~+5% range.

In one embodiment of the present invention, the training database establishes the artificial neural network, the ANN operational module adopts an algorithm for back-propagation neural networks (BPN) to train the artificial neural network by having each of the plurality of modified spectra as an input layer, each of the plurality of film thicknesses as an output layer, and obtaining a hidden layer by training the artificial neural network, so that the output layer is obtained by calculating the input layer through the hidden layer.

As stated above, the method for measuring a thickness of a thin film and the system for measuring the thickness of the thin film in accordance with the present invention apply the thin-film optical theory to simulate and thereby generate rapidly a huge amount of the simulated spectra and the corresponding film thicknesses, and also adopt the algorithm of the artificial neural network in a direct single-step manner, such that the recursive iterations for the fitting operation usually used in the art can be avoided, and the measurement speed can be significantly raised, evenly to be less than 100 ms for a measurement.

All these objects are achieved by the method and system for measuring a thickness of a thin film described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a method and a system for measuring a thickness of a thin film. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
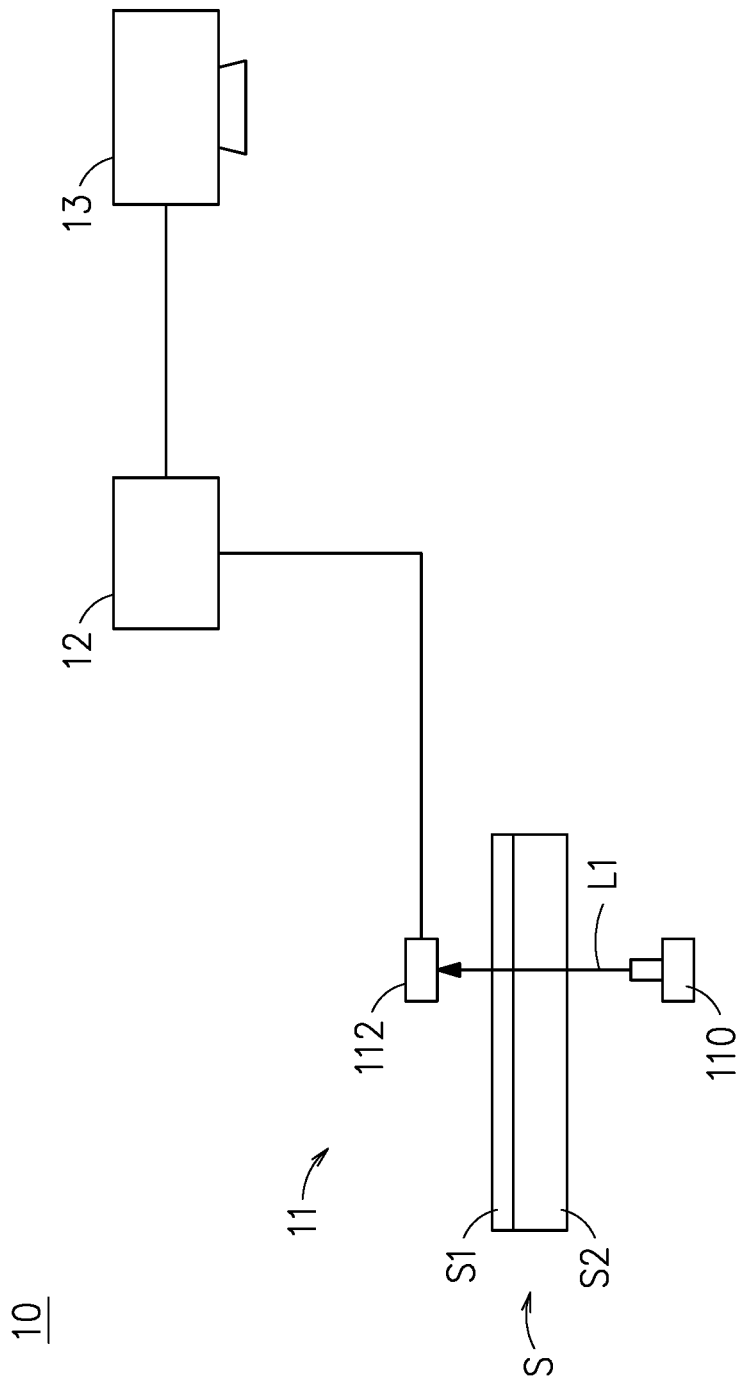
FIG. 1 is a schematic view of an embodiment of the system for measuring a thickness of a thin film in accordance with the present invention.
Figure 2:
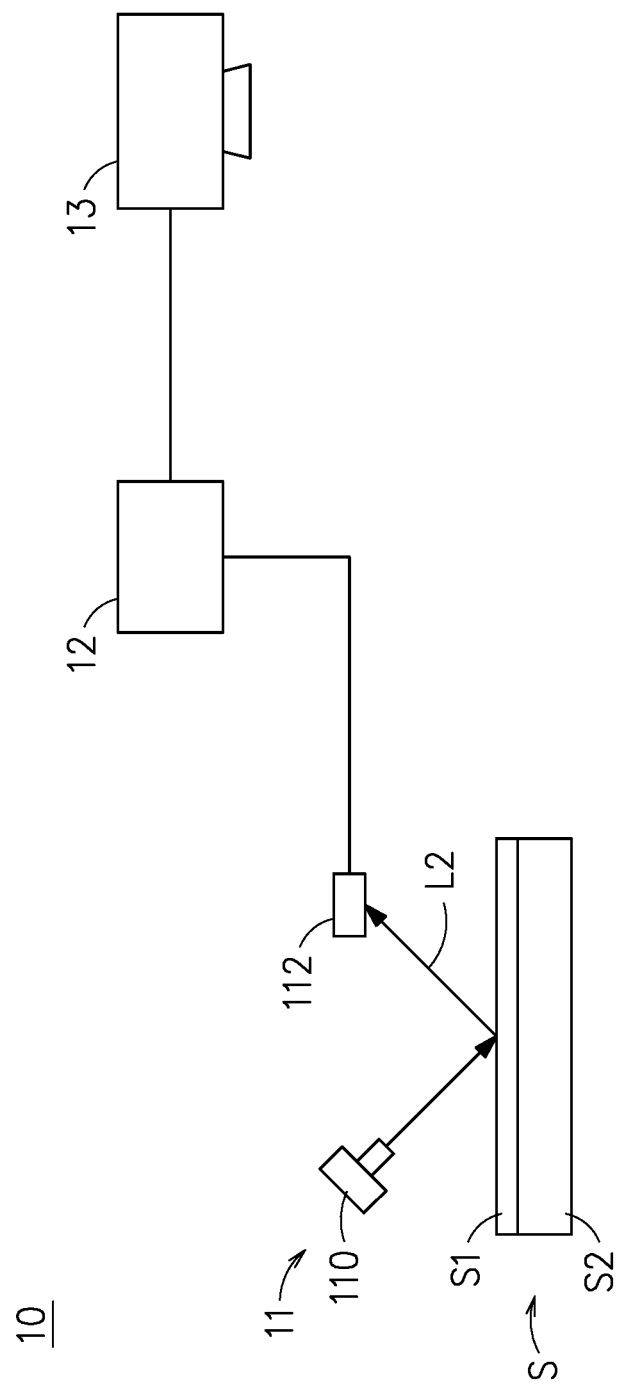
FIG. 2 is a schematic view of another embodiment of the system for measuring a thickness of a thin film in accordance with the present invention.

Refer now to FIG. 1 and FIG. 2; where FIG. 1 is a schematic view of an embodiment of the system for measuring a thickness of a thin film in accordance with the present invention, and FIG. 2 is a schematic view of another embodiment of the system for measuring a thickness of a thin film in accordance with the present invention. In both embodiments, the system 10 for measuring a thickness of a thin film is to measure a film thickness of a coated film of a sample S during a film-coating process. The sample S includes a substrate S2 and a coated film S1 on the substrate S2. In the present invention, the coated film S1 can be a silver film, a titanium film or the like metallic film, or can be a thin oxide film or a thin dielectric film, such as $TiO_2$ or $SiO_2$. The substrate S2 can be a transparent material such as a PET (Polyethylene terephthalate), a glass, or the like. In another embodiment, the substrate S2 can be a non-transparent material such as a silicon wafer or the like.

As shown, the system 10 for measuring a thickness of a thin film includes a measuring unit 11, a spectrometer 12 and a processing unit 13. The measuring unit 11 for projecting a light beam to the sample S includes a light source 110 and a collimator 112. The light source 110 and the collimator 112 are located to opposing sides of the sample S. The light source 110 emits a light beam L1 to penetrate the sample S, and then the collimator 112 receives the penetrating light beam L1 at the other side of the sample S. In FIG. 1, the system 10 for measuring a thickness of a thin film is served as a transmission-type system for measuring the film thickness. In another embodiment as shown in FIG. 2, the light source 110 and the collimator 112 are located at the same side of the sample S. The light source 110 emits a light beam L2 to the sample S, the light beam L2 is then reflected by the sample S, and finally the reflected light beam L2 is received by the collimator 112. Thus, in FIG. 2, the system 10 for measuring a thickness of a thin film is served as a reflection-type system for measuring the film thickness.

The spectrometer 12, connecting the collimator 112 of the measuring unit 11 via an optical fiber, is to receive a light beam from the collimator 112 in correspondence with the transmitted or reflected light beam. The spectrometer 12 realizes the light beam so as further to obtain a corresponding spectrum. Namely, as shown in FIG. 1, the spectrometer 12 is used to obtain a transmittance spectrum, while, in another embodiment as shown in FIG. 2, the spectrometer 12 is used to obtain a reflectance spectrum.

Figure 3:
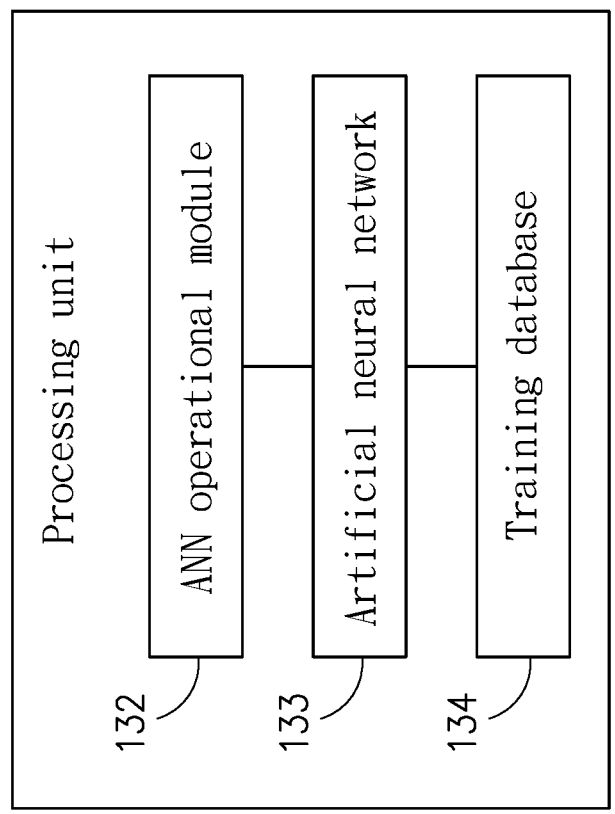
FIG. 3 is a schematic view of the processing unit in accordance with the present invention.

The processing unit 13 is electrically connected with the spectrometer 12. In FIG. 3, a schematic view of the processing unit 13 in accordance with the present invention is shown. The processing unit 13 includes an artificial neural network (ANN) operational module 132 and a training database 134. The ANN operational module 132 bases on the training database 134 to construction an artificial neural network 133. The training database 134 includes a plurality of modified spectra and a plurality of film thicknesses in correspondence to the modified spectra. Each of the modified spectra includes a respective simulated spectrum and a respective noise parameter, in which the noise parameter is in a −5%~+5% range. Under such an arrangement, after the processing unit 13 receives the spectrum (either the transmission type or the reflection type), the ANN operational module 132 runs the artificial neural network 133 so as to estimate a thickness of the coated film Si on the sample S with respect to the received spectrum.

Figure 4:
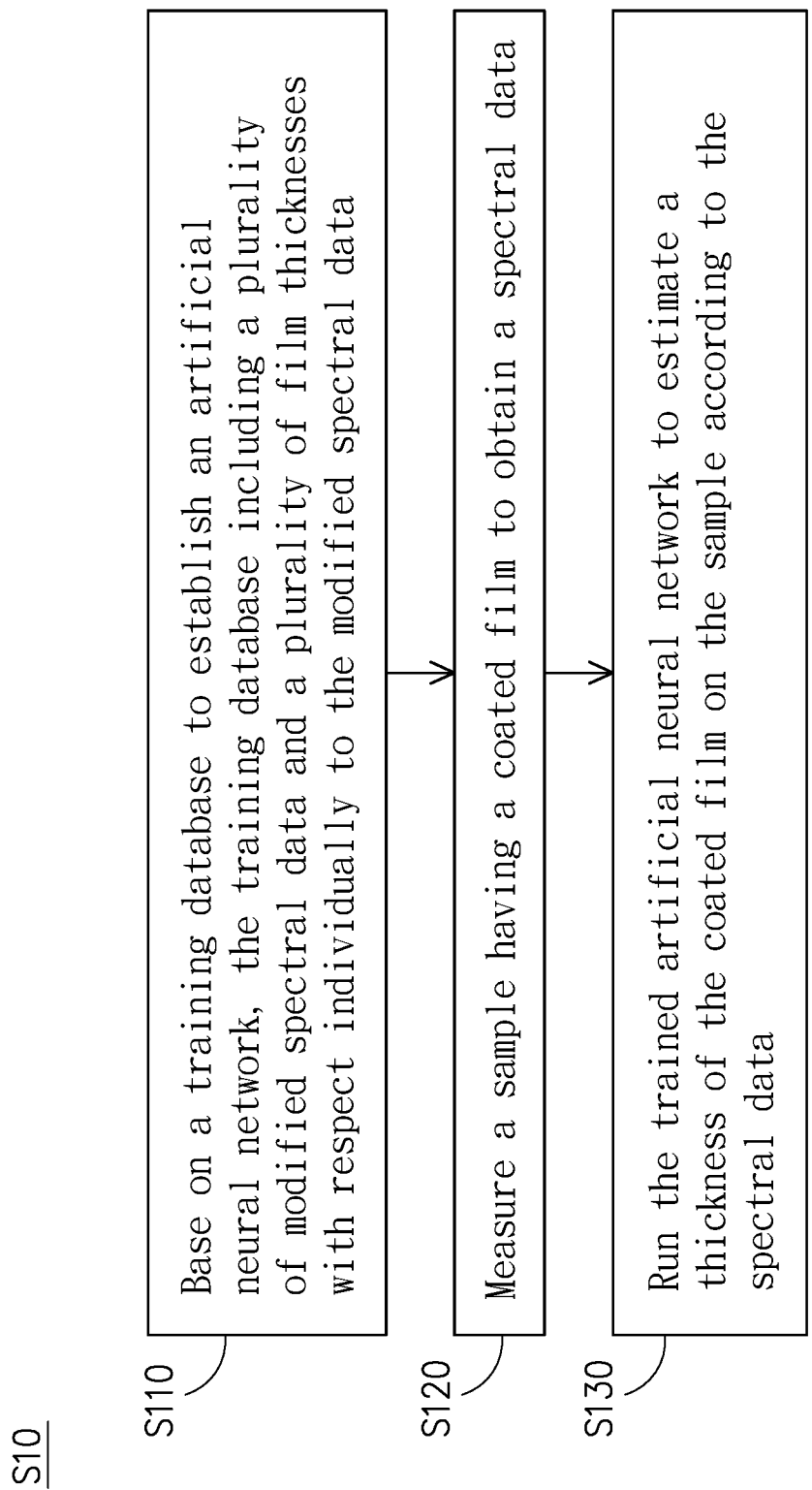
FIG. 4 is a flowchart of the preferred method for measuring a thickness of a thin film in accordance with the present invention.

FIG. 4 is a flowchart of the preferred method for measuring a thickness of a thin film in accordance with the present invention. As shown, the method S10 for measuring a thickness of a thin film can be applicable to both the transmission-type system for measuring the film thickness of FIG. 1 and the reflection system for measuring the film thickness of FIG. 2. In this embodiment, the method S10 for measuring a thickness of a thin film includes Step S110 to Step S130. In performing Step S110, an artificial neural network system bases on a training database 134 to construct an artificial neural network 133, in which the training database 134 includes a plurality of modified spectra and a plurality of film thicknesses with respect individually to the modified spectra.

Figure 5:
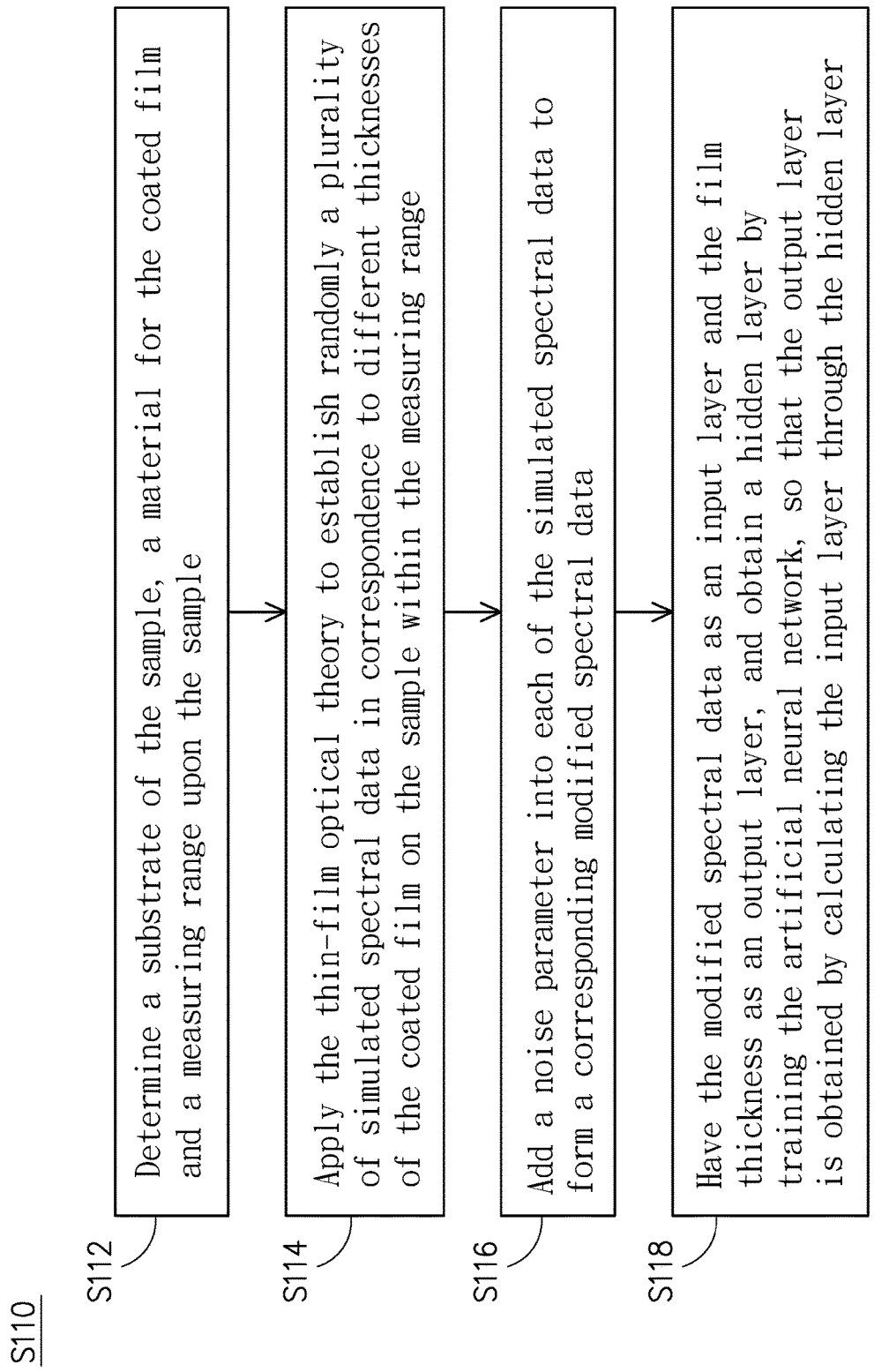
FIG. 5 is a detailed flowchart of Step S110 of FIG. 4.

Referring now to FIG. 5, a detailed flowchart of Step S110 in FIG. 4 is shown. In this embodiment, Step S110 of the method S10 for measuring a thickness of a thin film is to apply the thin-film optical theory to construct the training database 134 by including a huge amount of the spectra and the corresponding film thicknesses. In Step S112, determine a substrate S2 of the sample S, a material for the coated film S1 and a measuring range upon the sample S. In this embodiment, the method S10 is set to be a process for coating a thin silver film with a 10~30 nm thickness, the substrate S2 is a PET, the material for the coated film S1 is silver, and the measuring range is set to be within 5~40+ nm. Then, in Step S114, apply the thin-film optical theory to establish randomly a plurality of simulated spectra in correspondence to different thicknesses of the coated film on the sample within the preset measuring range, in which each of the simulated spectra includes an optical parameter of the sample with respect to a specific wavelength of the light beam. Preferably, the optical parameter is one of transmittance and reflectance. In the case that the system 10 for measuring a thickness of a thin film is served as the transmission-type system for measuring the film thickness as shown in FIG. 1, then the optical parameter is the transmittance so as thereby to generate the simulated transmittance spectrum. On the other hand, in the case that the system 10 for measuring a thickness of a thin film is served as the reflection-type system for measuring the film thickness as shown in FIG. 2, then the optical parameter is the reflectance so as thereby to generate the simulated reflectance spectrum. Then, in Step S116, a noise is added into each of the simulated transmittance or reflectance spectra so as to form a corresponding modified spectrum, in which the noise parameter is in the −5%~+5% range.

In this embodiment, while in applying the thin-film optical theory to establish randomly a plurality of the simulated spectra in correspondence to different thicknesses of the coated film S1 on the sample within the preset measuring range by fulfilling material properties of the substrate and the coated film, give S(d) to be a theoretical simulated transmittance (or reflectance) spectrum corresponding to a film thickness d; namely, a set of all transmittance (or reflectance) of the sample S under all individual wavelengths (W) of the light beam. Mathematical expression for the S(d) is as follows:

$$S(d)=\{T(d,W1),T(d,W2),\ldots,T(d,Wn)\} \quad (1).$$

In the mathematical expression (1), T(d,Wi) stands for the transmittance (or reflectance) of the sample S at a film thickness d and an incident-light wavelength Wi. Namely, T(d,W1) stands for the transmittance (or reflectance) of the sample S at a film thickness d and an incident-light wavelength W1, T(d,W2) stands for the transmittance (or reflectance) of the sample S at a film thickness d and an incident-light wavelength W2, and so forth.

Then, add the noise into the transmittance (or reflectance) T(d,W) so as to obtain a corresponding modified transmittance (or reflectance). In this example, the noise parameter is 3%. The modified transmittance (or reflectance) can be mathematically expressed as follows.

$$T'(d,W)=T(d,W)*(1+z) \quad (2).$$

In the mathematical expression (2), z is a random real number ranging from −0.03 to +0.03. By substituting different incident-light wavelengths into the mathematical expression (2), then T'(d,W1) can be obtained. The resulted T'(d,W1) is then substituted into the mathematical expression (1) so as to obtain the following mathematical expression (3) of a set of the modified spectra with respect to various film thicknesses d's.

$$S'(d)=\{T'(d,W1), T'(d, W2),\ldots, T'(d, Wn)\} \quad (3).$$

Repeat the aforesaid steps, to randomly generate the simulated spectra with respect to different film thicknesses on the sample within the measuring range, and further to add the noise parameter so as for generating 5000, for example, modified spectra. These modified spectra are introduced to form the training database 134 for training the artificial neural network 133. In another embodiment, the number of the modified spectra can be determined per practical requirements.

Then, the thin-film optical theory is applied to form the training database 134 by including a huge amount of the spectra with respect to different film thicknesses. In the step of training the artificial neural network 133, an algorithm for back-propagation neural networks (BPN) is applied. In Step S118, the modified spectra are planted into corresponding neurons in an input layer, where the input layer provides plenty of the neurons to nest different modified spectra. In addition, the film thickness is served as an output layer. By having the modified spectra to be transmitted and analyzed through connections of the neurons, an estimated result would be formed and thus planted into the output layer. Since the modified spectra and the film thicknesses form the training database by the thin-film optical theory, a hidden layer between the input layer and the output layer can be obtained by training the artificial neural network, so that the input layer can calculate to obtain the output layer through the hidden layer. Namely, in this invention, the training database 134 trains the artificial neural network to find out the hidden layer, such that the connection relationship between each of the modified spectra and the corresponding film thickness can be located.

In this embodiment, after the connection relationship between each of the modified spectra and the corresponding film thickness is located in Step S110, then, in the following measurement, the spectrum is the only information needed to be known for obtaining the corresponding film thickness by referring to the spectrum and the connection relationship. Referring back to FIG. 4, in Step S120, a sample is measured to obtain a spectrum. In the embodiment shown in FIG. 1, a transmittance spectrum can be obtained by the spectrometer 12. In the embodiment shown in FIG. 2, a reflectance spectrum can be obtained by the spectrometer 12.

Then, in Step S130, a thickness of the coated film S1 on the sample S can be estimated by inputting the spectrum realized by the spectrometer 12 into the trained artificial neural network 133. Namely, input the spectrum of the sample S, the ANN operational module 132 would calculate the artificial neural network 133 already trained by the training database 134 so as to estimate the corresponding thickness of the coated film S1 through the aforesaid Step S130.

Figure 6:
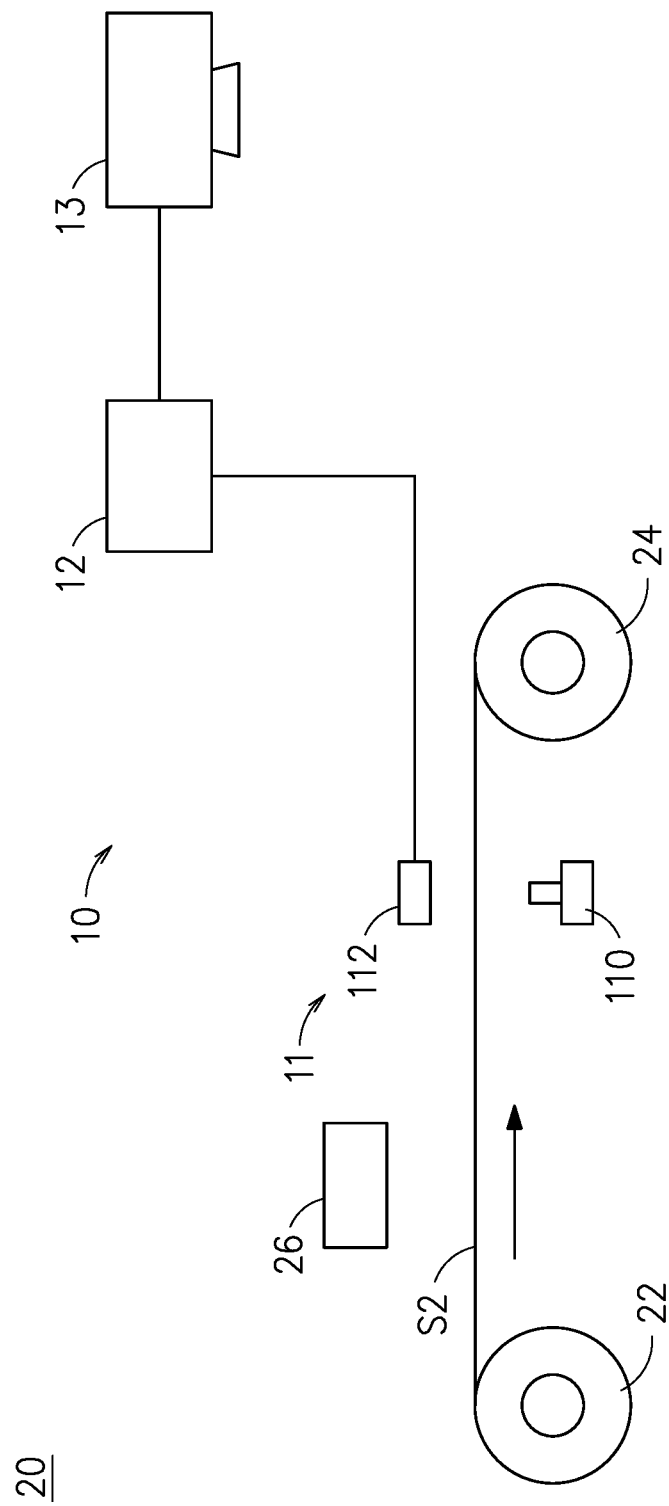
FIG. 6 is a schematic application of FIG. 1.

Referring now to FIG. 6, an application of FIG. 1 is demonstrated schematically. As shown in FIG. 6, a roll-to-roll film-coating system 20 includes an unwinder 22, a rewinder 24, a film-coating member 26 and the system for measuring a thickness of a thin film 10 as described above. One end of a substrate S2 in connected with the unwinder 22, while another end thereof is connected with the rewinder 24. The unwinder 22 is to roll and feed the substrate S2, while the rewinder 24 is to roll and store the substrate S2. The film-coating member 26 is to perform a roll-to-roll film-coating process for coating a film onto the substrate S2. In addition, the light source 110 of the system for measuring a thickness of a thin film 10 is to emit a light beam to penetrate through the substrate S2, and the collimator 112 bases on the light beam penetrating the substrate S2 to obtain the transmittance of the thin film coated on the material S2. Then, the spectrometer 12 obtains a corresponding transmittance spectrum by realizing the received light beam. The processing unit 13 can apply the artificial neural network 133 already trained for obtaining a corresponding film thickness simply through the spectrum (based on the aforesaid teaching related to FIG. 1 through FIG. 5) to obtain a real-time film thickness of the thin film coated on the substrate S2 in a direct single-step manner by inputting the transmittance spectrum into the artificial neural network 133. Thus, in a magnetron sputtering process to grow the thin film, the instant thickness of the thin film can be measured in a real-time manner, so that the growing of the thin film can be understood immediately. Thereupon, the object of monitoring the film-coating process in a real-time manner can be achieved.

Figure 7:
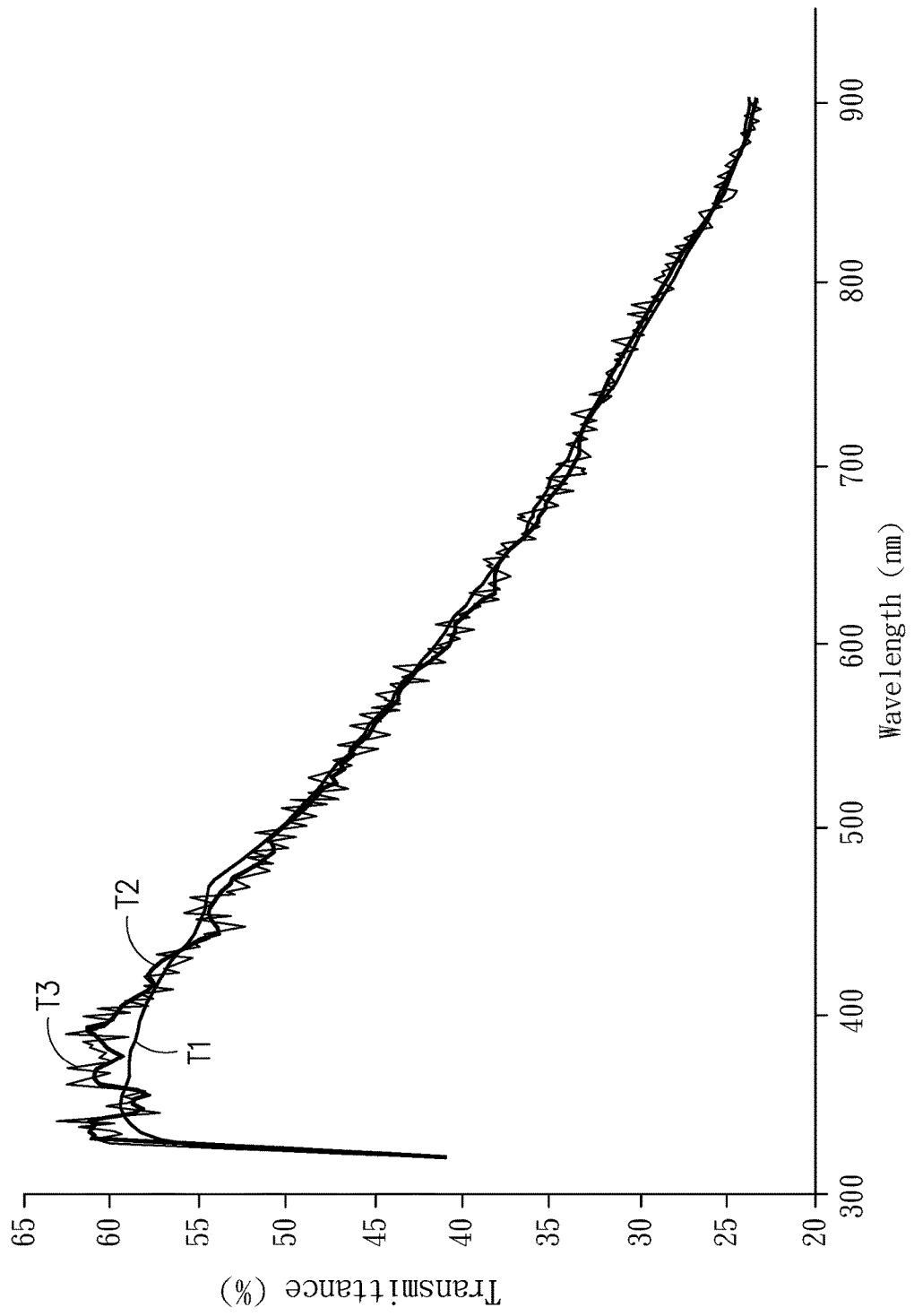
FIG. 7 demonstrates schematically comparisons of the modified simulated spectra, the simulated spectra and experimental spectra in accordance with the present invention.

Referring now to FIG. 7, comparisons of the modified simulated spectra, the simulated spectra and the experimental spectra in accordance with the present invention are demonstrated schematically. In FIG. 7, the horizontal axis is the wavelength, and the vertical axis is the transmittance. In the present invention, the artificial neural network algorithm is applied. It is well known that, in a precision artificial neural network algorithm, a huge numbering training data shall be needed. By having 5000 training data for example, in the case that the experimental spectra like T1 are applied, the experimental spectrum T1 is obtained from an experiment. Each data of the experimental spectra includes a growing film, a taking sample, and a measuring film thickness. In measuring one film thickness, a substantial time is needed. Thus, for all the 5000 data of the experimental spectra, plenty of time and expenses are inevitable. Even seriously, in the case if the material for the thin film varies, more labor time can be expected to accumulate the 5000 data of the experimental spectra like T1 for each of the materials of the thin film.

On the other hand, by providing the method and system for measuring a thickness of a thin film in accordance with the present invention, the thin-film optical theory uses a simulation method to generate rapidly and massively a huge number of simulated spectra like T2 and the corresponding film thicknesses (generally, thousand data in a few minutes). Thereby, the time-consumption shortcoming in obtaining the experimental spectra can be resolved.

In addition, the method and system for measuring a thickness of a thin film of the present invention further consider that, during the practical film-coating process, the measured spectrum would be affected by the pressure, the temperature and any processing and environmental factors. Since micro structures of the thin film would vary somewhat according to the aforesaid factors, from which the measured spectrum T1 and the simulated spectrum T2 would be slightly perturbed, thus the simulated spectrum T2 is added by a 3% noise parameter so as to produce a corresponding modified spectrum T3. The modified spectrum T3 is enough to cover the possible practical spectrum measured under almost all perturbed situations. By adding the 3% noise parameter, a large number of different spectra would be generated. By having the modified spectra like T3 to train the artificial neural network, the corresponding trend of spectrum with respect to the same film thickness would be realized as well. Namely, by having the artificial neural network to be trained by the modified spectra like T3, while in measuring the instant spectrum, the artificial neural network can then estimate the corresponding film thickness by judging the trend of the spectrum.

Figure 8:
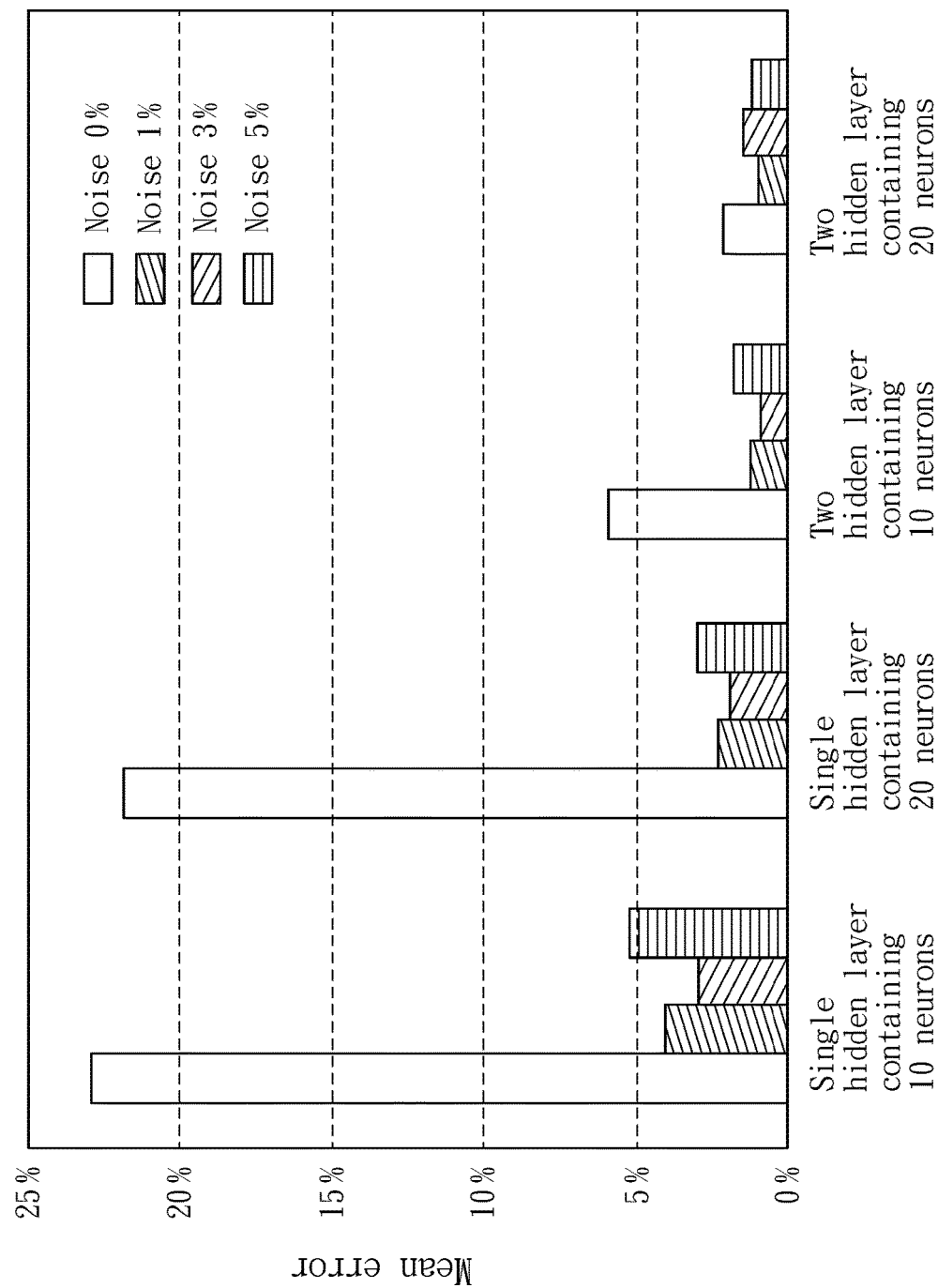
FIG. 8 is a schematic view showing influences of the artificial neural network and the added noise upon calculations of the film thickness in accordance with the present invention.

Referring now to FIG. 8, a schematic view showing influences of the artificial neural network and the added noise upon calculations of the film thickness in accordance with the present invention is presented. In the present invention, the algorithm for back-propagation neural networks (BPN) is applied to train the artificial neural network for both the method and the system for measuring a thickness of a film in accordance with the present invention. In the artificial neural network, the hidden layer can be a single-layer structure or a double-layer structure. As shown, Table 1 involves a single hidden layer, while Table 2 involves two hidden layers. In addition, each the hidden layer includes 10 or 20 neurons.

TABLE 1

| | Artificial neural network | | | | | | | |
|---|---|---|---|---|---|---|---|---|
| | Single hidden layer with 10 neurons | | | | Single hidden layer with 20 neurons | | | |
| | Noise added | | | | | | | |
| Practical film thickness (nm) | 0% | 1% | 3% | 5% | 0% | 1% | 3% | 5% |
| | Estimated film thickness (nm) by artificial neural network | | | | | | | |
| 10.00 | 15.06 | 10.98 | 10.66 | 10.08 | 14.77 | 10.76 | 10.48 | 10.61 |
| 10.90 | 16.27 | 11.88 | 11.64 | 12.12 | 15.57 | 11.56 | 11.32 | 11.57 |
| 11.70 | 16.61 | 12.45 | 12.27 | 13.01 | 15.72 | 12.09 | 11.91 | 12.10 |
| 12.60 | 17.48 | 13.26 | 13.15 | 13.96 | 16.70 | 12.96 | 12.79 | 12.84 |
| 13.80 | 17.24 | 14.12 | 14.12 | 14.67 | 16.45 | 13.93 | 13.81 | 13.64 |
| 15.20 | 17.73 | 15.30 | 15.43 | 15.64 | 17.23 | 15.23 | 15.13 | 14.73 |
| 16.90 | 17.99 | 16.82 | 17.06 | 17.08 | 17.46 | 16.87 | 16.75 | 16.29 |
| 19.10 | 18.86 | 18.81 | 19.11 | 19.08 | 18.13 | 18.93 | 18.84 | 18.53 |
| 21.80 | 20.36 | 21.37 | 21.63 | 21.65 | 19.13 | 21.56 | 21.46 | 21.52 |
| 25.40 | 23.22 | 24.73 | 24.94 | 24.88 | 21.69 | 25.00 | 24.95 | 25.18 |
| 30.20 | 27.06 | 29.13 | 29.44 | 29.16 | 25.30 | 29.65 | 29.60 | 29.67 |
| Mean error | 23.22% | 3.97% | 2.96% | 5.25% | 21.96% | 2.41% | 1.82% | 2.93% |

TABLE 2

| | Artificial neural network | | | | | | | |
| --- | --- | --- | --- | --- | --- | --- | --- | --- |
| | Two hidden layers, each with 10 neurons | | | | Two hidden layers, each with 20 neurons | | | |
| | Noise added | | | | | | | |
| Practical film thickness (nm) | 0% | 1% | 3% | 5% | 0% | 1% | 3% | 5% |
| | Estimated film thickness (nm) by artificial neural network | | | | | | | |
| 10.00 | 7.65 | 10.05 | 9.95 | 10.26 | 10.34 | 10.00 | 10.26 | 9.99 |
| 10.90 | 9.19 | 10.64 | 11.00 | 11.20 | 11.32 | 10.83 | 11.11 | 11.09 |
| 11.70 | 10.92 | 11.26 | 11.85 | 11.94 | 12.02 | 11.55 | 11.71 | 11.95 |
| 12.60 | 12.66 | 12.27 | 12.86 | 12.88 | 13.00 | 12.51 | 12.57 | 12.98 |
| 13.80 | 14.01 | 13.96 | 14.01 | 13.98 | 14.08 | 13.65 | 13.69 | 14.10 |
| 15.20 | 15.53 | 15.10 | 15.36 | 15.31 | 15.46 | 15.02 | 15.11 | 15.41 |
| 16.90 | 17.50 | 17.03 | 17.02 | 16.87 | 17.06 | 16.75 | 16.84 | 16.98 |
| 19.10 | 19.65 | 19.22 | 19.03 | 18.88 | 19.26 | 18.86 | 18.88 | 19.02 |
| 21.80 | 21.68 | 21.83 | 21.70 | 21.51 | 21.95 | 21.51 | 21.42 | 21.63 |
| 25.40 | 24.82 | 25.25 | 25.34 | 24.73 | 25.28 | 25.03 | 24.75 | 25.16 |
| 30.20 | 28.87 | 29.88 | 29.82 | 29.25 | 29.42 | 29.64 | 29.22 | 29.99 |
| Mean error | 5.79% | 1.30% | 0.94% | 1.82% | 2.03% | 1.06% | 1.40% | 1.26% |

Based on practical experiments, the difference between the practical film thickness (nm) and the film thickness (nm) estimated by the artificial neural network is observed. Regarding the noise addition, it is found that, in comparison with the examples having no noise added, the examples with appropriate noise addition would be positive for the artificial neural network to estimate a precise film thickness. In particular, in the example of adding the 3% noise parameter, the error in estimating the film thickness is further reduced.

In summary, the method for measuring a thickness of a thin film and the system for measuring the thickness of the thin film in accordance with the present invention apply the thin-film optical theory to simulate and thereby generate rapidly a huge amount of the simulated spectra and the corresponding film thicknesses, and also adopt the algorithm of the artificial neural network in a direct single-step manner, such that the recursive iterations for the fitting operation usually used in the art can be avoided, and the measurement speed can be significantly raised evenly to be less than 100 ms for a measurement.

Further, by adding the noise parameter into the simulated spectrum so as to generate the corresponding modified spectrum for the input layer of the artificial neural network, then a large amount of different spectra can be generated. By having the modified spectra to train the artificial neural network, the corresponding trend of spectrum with respect to the same film thickness would be realized as well. Thereupon, accuracy of calculation through the artificial neural network can be significantly enhanced, such that the film thickness in midst of the film-coating process can be monitored in a real-time manner, and thereby process parameters can be adjusted in time during the process so as to stabilize manufacturing quality or to vary the property of the product in time.

In addition, based on practical experiments, it is found that, in comparison with the examples having no noise added, the examples with appropriate noise addition would be positive for the artificial neural network to estimate a precise film thickness. In particular, in the example of adding a 3% noise parameter, the error in estimating the film thickness is further reduced. Hence, by providing the method and system of the present invention, the estimation for an instant film thickness upon even a super-thin film can be precise to some extent. By utilizing the artificial neural network, an appropriate training database can be established for a specific thin-film material and/or a specific measuring range. After the artificial neural network is trained to estimate the film thickness accurately, its error in the film thickness would be superior to that by a conventional measurement device. By having a process to coat a 10-nm silver film for example, the error resulted from the artificial neural network would be about 0.05 nm.

Furthermore, in the present invention, since the non-destructive optical method is applied to measure the sample in either a light-penetration manner or a light-reflection manner, integrity of the sample can be preserved, and the manufacturing process upon the sample would be kept unaffected.

In addition, in a magnetron sputtering process to grow the thin film, the instant thickness of the thin film can be measured in a real-time manner, so that the growing of the thin film can be understood immediately. Thereupon, the object of monitoring the film-coating process in a real-time manner can be achieved. Besides, the method and system of the present invention can be applied to coat a silver film, a titanium film, and the like metallic film, and also to coat a thin oxide film or a thin dielectric film such as $TiO_2$ or $SiO_2$. Hence, the method and system provided by the present invention are also beneficial for producing optical components and to the semiconductor industry. Further, in the present invention, the training database can be established to relate the simulated spectra of the multi-layer film to the corresponding film thicknesses. Also, an artificial neural network can be trained to become capable of estimating the film thickness of each film layer of a multi-layer film. Namely, the method and system provided the present invention can be applicable to both the single-layer film and the multi-layer film.

While the present invention has been particularly shown and described with reference to a preferred embodiment, it will be understood by those skilled in the art that various changes in form and detail may be without departing from the spirit and scope of the present invention.

What is claimed is:

1. A method for measuring a thickness of a thin film, comprising the steps of:
    (1) basing on a training database to establish an artificial neural network, the training database including a plurality of modified spectra and a plurality of film thicknesses corresponding individually to the plurality of modified spectra; wherein the step (1) includes the steps of:

(11) determining a substrate of the sample, a material of the coated film, and a measuring range for the sample;

(12) applying the thin-film optical theory to establish randomly a plurality of simulated spectra in correspondence to different thicknesses of the coated film on the sample within the measuring range, in which each of the plurality of simulated spectra includes an optical parameter of the sample with respect to a specific wavelength of the light beam; and

(13) adding a noise parameter into each of the plurality of simulated spectra so as to form corresponding one of the plurality of modified spectra;

(2) measuring a sample having a coated film so as to obtain a spectrum; and (3) running the artificial neural network already trained by the plurality of modified spectra so as to use the spectrum to estimate a thickness of the coated film on the sample.

2. The method for measuring a thickness of a thin film of claim 1, wherein the optical parameter includes one of transmittance and reflectance.

3. The method for measuring a thickness of a thin film of claim 1, wherein the noise parameter is in a −5%~+5% range.

4. The method for measuring a thickness of a thin film of claim 1, wherein the step (1) further includes a step of having each of the plurality of modified spectra as an input layer, each of the plurality of film thicknesses as an output layer, and obtaining a hidden layer by training the artificial neural network, so that the output layer is obtained by calculating the input layer through the hidden layer.

5. The method for measuring a thickness of a thin film of claim 4, wherein the artificial neural network is trained by adopting an algorithm for back-propagation neural networks (BPN).

6. A system for measuring a thickness of a thin film, comprising:

a measuring unit, being to emit a light beam onto a sample having a coated film;

a spectrometer, connected with the measuring unit, being to receive the light beam and thereby to obtain a spectrum; and a processing unit, connected with the spectrometer, including an artificial neural network (ANN) operational module and a training database, the ANN operational module basing on the training database to establish an artificial neural network; wherein the training database includes a plurality of modified spectra and a plurality of film thicknesses corresponding individually to the plurality of modified spectra, and the ANN operational module receives the spectrum, the ANN operational module runs the artificial neural network already trained by the plurality of modified spectra so as to use the spectrum to estimate a thickness of the coated film on the sample;

wherein each of the plurality of modified spectra includes a simulated spectrum and a noise parameter;

the ANN operational module determines a substrate of the sample, a material of the coated film, and a measuring range for the sample;

the ANN operational module applies the thin-film optical theory to establish randomly a plurality of simulated spectra in correspondence to different thicknesses of the coated film on the sample within the measuring range, in which each of the plurality of simulated spectra includes an optical parameter of the sample with respect to a specific wavelength of the light beam; and the ANN operational module adds a noise parameter into each of the plurality of simulated spectra so as to form corresponding one of the plurality of modified spectra.

7. The system for measuring a thickness of a thin film of claim 6, wherein the noise parameter is in a −5%~+5% range.

8. The system for measuring a thickness of a thin film of claim 6, wherein the training database establishes the artificial neural network, the ANN operational module adopts an algorithm for back-propagation neural networks (BPN) to train the artificial neural network by having each of the plurality of modified spectra as an input layer, each of the plurality of film thicknesses as an output layer, and obtaining a hidden layer by training the artificial neural network, so that the output layer is obtained by calculating the input layer through the hidden layer.

* * * * *